Jan. 10, 1967 J. C. McGUIRE 3,297,063
FURNITURE TRANSVERSE BUTT JOINT
Filed Oct. 14, 1964
FIG_1
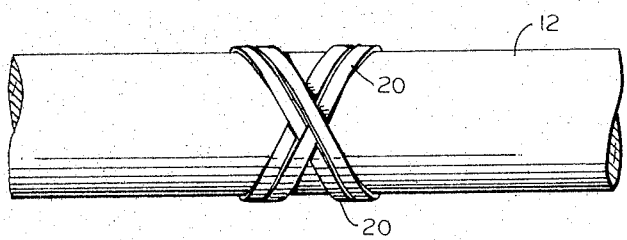
FIG_2
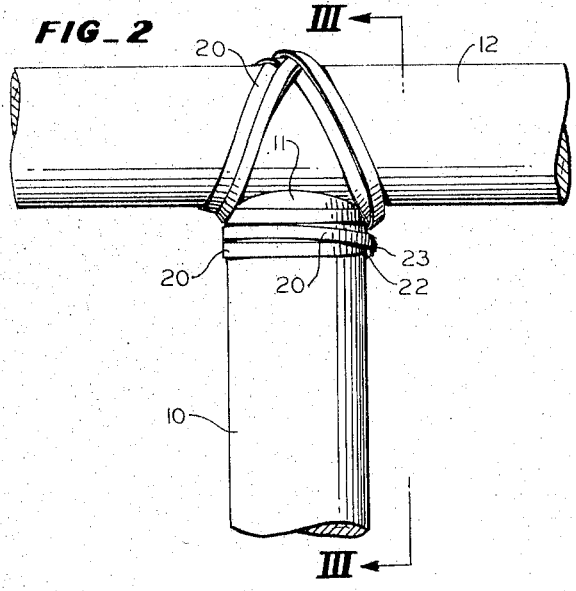
FIG_3
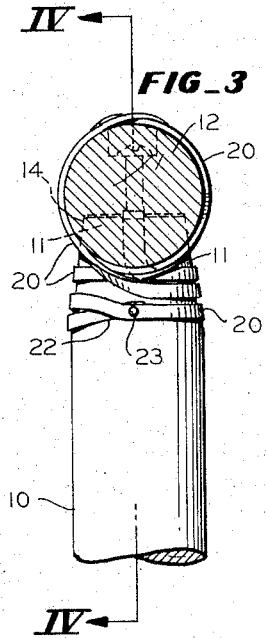
FIG_4
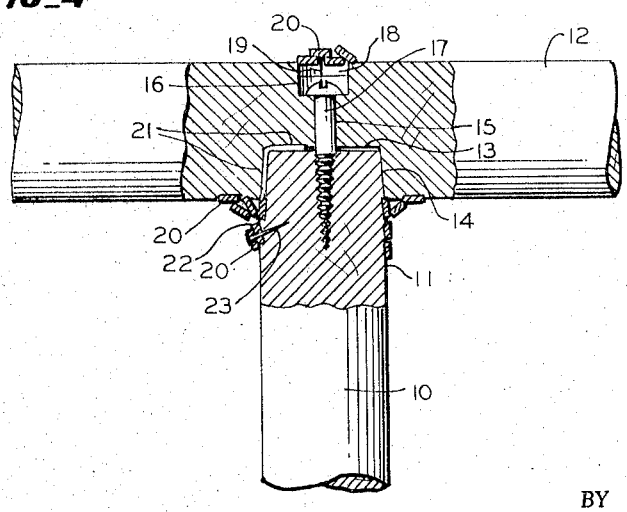
INVENTOR.
JOHN C. McGUIRE
BY *Henry Gifford Hardy*
ATTORNEY United States Patent Office 3,297,063
Patented Jan. 10, 1967

3,297,063
FURNITURE TRANSVERSE BUTT JOINT
John C. McGuire, 44 Normandie Terrace,
San Francisco, Calif. 94115
Filed Oct. 14, 1964, Ser. No. 403,893
2 Claims. (Cl. 144—318)

This invention relates to furniture joints and particularly to rawhide bound rattan butt joints.

For many years the stems of certain related climbing palms known generally as rattan, of which calamus and palasan are examples, have been used to form furniture. Recently furniture made with the whole stem or cane has been held in favor because of the inherent strength of the stems of the rattan palm used in construction and because of the pleasing appearance of the finished product. While rattan is easily shaped, difficult problems arise from the very nature of the rattan itself in making strong and lasting joints, and particlarly butt joints. The rawhide laces used as bindings for rattan joints to make them stronger, have themselves created problems.

Physically rattan stems or cane are a cylindrical bundle of longitudinal hollow fibers which have a structurally weak transverse cohesion giving this material a low threshold against side compression as well as reducing its nail and screw holding capabilities. Screws and nails will not hold when placed in the butt ends of rattan because they merely compress the adjacent fibers. Also, they have a tendency to work loose when placed transversely and across the fibers of the rattan. The normal use of fastenings for furniture joints are not effective in the making of rattan furniture. Furthermore, the hollow fibers have properties of capillarity, permeability and related physical phenomena which make rattan stems highly absorbent and particularly so at the ends and shaved areas which occur where the stem is cut or tapered. The rawhide used as bindings for the rattan joint is wet and stretched when applied. Upon drying in the finished wrapped position it shrinks into place, and holds the joint. Previously, to hold a butt joint with rawhide bindings it was necessary to use several short pieces of rawhide to bring the right pressures to maintain a firm joint. This meant nailing the ends and fitting them under the turns of the bindings. However, some of these joints show a tendency to have the nails work loose and the bindings loosened just enough to make the joint not as secure as desired.

Rawhide bound rattan joints have a further complication. Even though the rawhide used is soaked in water, residue oils are retained in the rawhide. As the rawhide shrinks into place after being bound about the rattan joint, the internal squeezing produced releases the oils still remaining within the rawhide. The obsorbency of rattan causes a transference of oil from the rawhide into the rattan fibers. Such a penetration of the oil into the rattan not only causes unsightly discoloration, but prevents it from properly receiving stains and colors and holding lacquers.

In many instances the security and permanence of the rattan joint is dependent upon the tightness of the wrappings and how long they stay tight. The tightness itself is in a great measure determined by the amount of shrinkage which occurs during drying after the wrappings of the butt joint have been made. How long the bindings stay tight is determined to some extent by the amount of moisture absorbed by the rawhide bindings. This factor of uncertainty has plagued manufacturers and users alike and has limited or restricted the use of rawhide bindings for meeting the rigors of use in furniture.

Accordingly, it is an object of the present invention to provide a strong rawhide bound butt joint of rattan of substantial permanence, which is inherently difficult to permanently butt join, and in so doing to make a butt joint which is not only durable and rigid, but pleasing to the eye as well.

It is another object of the present invention to provide a rattan butt joint bound with rawhide which binding is a single length of rawhide with a minimal dependence on securing brads.

It is a further object of the present invention to provide a rattan butt joint bound with a specially treated rawhide which has substantially all of its available retained oils removed, enabling the rattan joint and binding to lastingly hold colors, stains, lacquers and the like.

It is also an object of the present invention to provide a rattan butt joint having a specially treated rawhide binding which has a usable stretch limit beyond that of the usual soaking so as to provide greater shrinkage in place and therefore a tighter joint, and with practically no possibility of release due to subsequent moisture absorption.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings:

FIGURE 1 is a top plan view of the rawhide bound rattan butt joint showing the inter-lacings of the bindings on the top of the joint;

FIGURE 2 is a side elevational view of the same joint showing the diagonal and transverse rawhide bindings and the nature of the finished and bound joint;

FIGURE 3 is an end elevational view of the same butt joint showing the finished binding with the anchorages of the rawhide ends, one end secured internally within the joint shown by broken lines and the other end tucked under the rawhide binding and nailed in position; and FIGURE 4 is a vertical section along line IV—IV of FIGURE 3 looking in the direction of the arrows.

Referring now more particularly to the drawings in which like reference numerals indicate like parts in the several views, 10 is a portion of a rattan stem member which is to be butt joined to the transverse stem member 12. As will be observed, the butt end 13 of the stem member 10 has a gentle taper 11 adjacent the butt end 13 which is cut substantially transversely. The transverse stem member 12 is provided with a recess 14 for receiving the tapered end 13 therein in frictional engagement. Axially aligned with the recess 14 is a bore of smaller diameter 15 which communicates with the bottom of recess 14 with the counterbore 16 axially aligned on the opposite side of the stem. Bore 15 provides a close tolerance fit for the shaft of wood screw or pin 17. Plug 18 seals the counterbore 16 to give a uniform and finished surface.

The rawhide binding strip 20 is a specially treated (as will be more fully disclosed) single continuous strip cut from untanned cowhide and the like. The starting end 21 is secured or anchored in the joint (see FIGURES 3 and 4) and terminating end 22 is tucked under a turn of the rawhide strip 20 and held in the tucked position by the shrinkage pressure of rawhide strip 20 and by brad 23 (see FIGURES 2, 3 and 4).

While joints for furniture have been bound with rawhide before, no butt joint has been so bound, primarily because it was not heretofore possible to use a single length and accomplish a satisfactory result. It is now only possible because of the special treatment of rawhide strip 20. The special treatment of the rawhide bindings involves the removal of substantially all of its retained residue oils and the increased stretch of the rawhide strip 20 beyond that possible by merely soaking in warm water. Rawhide strip 20 is soaked in a warm bath which is eighty percent by volume warm water and twenty percent methyl alcohol. This soaking in the methyl alcohol solution removes the residue oils which are available for release and absorption by the rattan. After a thorough soaking it is stretched to substantially the maximum extent. It has been found that soaking in this solution unexpectedly produces an increase in the stretch of from 5% to 10%, without in any way affecting the structure of the rawhide and without interfering with its capability of shrinkage upon drying.

The stretched and soaked rawhide strip 20, before it has had a chance to lose any of its water and alcohol content and thereby shrink, is positioned with its starting end 21 in the bottom of the bore 14 (see FIGURES 3 and 4). The tapered butt end 13 of rattan member 10 is inserted into bore 14 with the rawhide binding between it and the side wall of the bore 14. The fibers of the taper 11 will compress to accommodate the strip and when the butt end 13 is seated in the bore a tight fit is achieved with starting end 21 pressed permanently into place. The wood screw or pin 17 is inserted through bore 15 until contact is made with the top of the butt end 13 and is screwed or driven in place until its head is seated against the shoulders at the bottom of the counterbore 16. By this means, the wood screw or pin 17 has pulled up the member 10 into its seat 14 causing all of the members to cooperate in making an exceedingly tight fit, but it also produces a metallic core which lends rigidity to the joint. In time the wood screw or pin 17 would work loose and not hold, but only the initial holding is required, and this it does effectively.

Before binding the rattan members 10 and 12 together in the butt joint, a tight fitting plug 18 may be driven into counterbore 16 until the bottom of plug 18 is hard against the head of wood screw or pin 17. The top surface of plug 18 is made from smooth and flush with the surface of rattan member 12 so as to resemble it as a part thereof.

The binding operation must be carried out while rawhide strip 20 still has retained in it the water-alcohol solution from soaking and while the strip is stretched to approximately its maximum limit. The strip should be tight in each and every turn and starts with one complete turn around tapered end 11 of rattan member 10 adjacent rattan member 12. The wrapping is then continued by a series of alternate diagonal turns from tapered end 11 and around member 12 crossing over its top and the top of plug 18 along the sides with an inter-lacing effect directly over plug 18. (See FIGURE 1.) Thus, the lacing or turns of the rawhide strip 20 covers and holds plug 18 in place.

Rawhide strip 20 is then wound in a few tight turns around tapered end 11 of member 10 adjacent member 12, but each turn is juxtaposed so that there is a minimum of overlap and these only when it is necessary to do so (see FIGURES 2 and 4). The end 22 of the rawhide strip 20 is tucked under its final turn and then brad 23 is driven through rawhide strip 20 and end 22 thereby securing the rawhide strip terminating end 22 in position both by the constriction of the turn and the anchoring of the brad.

When the wrapping is completed the joint and particularly the rawhide dries and shrinks. The drying may be induced by any of the well-known drying methods. Since the special water-alcohol solution bath has increased the strength stretch of rawhide strip 20, this also provides for an increased shrinkage.

The tremendous pull of the rawhide with its extra stretch, and as it shrinks and stiffens, it compresses itself into permanent anchorages or grooves in the surfaces of the rattan members, taking advantage of the low compression threshold of the rattan. The secure anchorage of both ends permits the lateral shrinkage to take place between these two fixed points, making the butt joint tighten more and more as the rawhide dries. The screw or pin 17 prevents any axial misalignment. All of these features combine to produce a rattan butt joint having increased strength and rigidity which cannot be achieved in any other way and makes it durable enough for the very toughest furniture use, while producing an unusual decorative result.

While the extra stretching produces extra shrinkage and greater tightening as the drying is completed, the squeezing or shrinkage of the rawhide does not release any residual oils for absorption by and staining of the fibers of the rattan. In this manner both the rattan and the rawhide bindings take the lacquers and other finishes smoothly and uniformly which has not heretofore been possible.

It will be observed that no brads or nails alone are relied upon to hold the rawhide ends against the pull of the shrinkage. The beginning end is held in the bore 14 and the brad 23 at the terminating end is held and reinforced by the compression of the overlap. With the extra stretch, and therefore the extra pull on shrinkage, brads alone could not hold.

In order to clarify the kind of joint involved in this invention the butt joint described herein is a transverse butt joint where one member is at an angle with respect to the other member. It is not intended to cover the butt joint where the members are end to end without overlap.

The rattan which is used here means the stem or cane of a climbing palm or vine which as a substantial, and for the most part uniform, diameter or thickness and which is made up of longitudinal hollow fibers as before stated. The stems or canes as used may be circular in cross-section and substantially as they exist in nature, or they may be shaped into forms having flat faces or a combination of both.

Also, it is to be understood that although the description herein has been directed to a T-shaped joint where the second rattan member is substantially at right angles to the first rattan member, the butt joint can be made at various angles consistent with the material used. The same structure and the same procedures are involved. Accordingly, angled joints other than right angle joints are intended to be included within the scope of the appended claims.

I claim:

1. The method of making a transverse butt joint for whole stem rattan members comprising tapering the butt end of a first rattan member, preparing a tapered socket in a transverse second rattan member at right angles to the longitudinal axis thereof to snugly receive the butt end of said first member, treating a single length to rawhide binding strip with a solution of alcohol and water and then stretching the same to its maximum limit, placing one end of the wet and stretched rawhide binding strip in the bottom of said socket and holding the same in place by inserting said butt end into said socket into engagement with the rawhide strip, drawing said first and second rattan members into firm engagement without bottoming the butt end in said socket, tightly lacing the rawhide binding strip while wet and stretched around said first rattan member and over the second rattan member in a crossing pattern, securing the free end of the rawhide binding under one of the turns thereof, and drying said rawhide for gripping deformation of the rattan members and further moving the first rattan member into the socket of the second rattan member by shrinkage of the rawhide binding strip.

2. The method of making a transverse butt joint for whole stem rattan members comprising tapering the butt end of a first rattan member, preparing a tapered socket in a transverse second rattan member at right angles to the longitudinal axis thereof to snugly receive the butt end of said first member, treating a single length of rawhide binding strip with not more than a 20% solution of methyl alcohol and water to remove from the rawhide oil substance which would be absorbed in the rattan members and to provide extra stretch, and then stretching the same to its maximum limit, placing one end of the wet and stretched rawhide binding strip in the bottom of said socket and holding the same in place by inserting said butt end into said socket into engagement with said rawhide strip, providing means to draw and drawing said butt end into said socket, tightly lacing the rawhide binding strip while wet and stretched around said first rattan member and over the second rattan member in a crossing pattern and over the drawing means to conceal and maintain the same, securing the free end of the rawhide binding under one of the turns thereof, and drying said rawhide for gripping deformation of the rattan members and further moving the first rattan member into the socket of the second rattan member by shrinkage of the rawhide binding strip.

References Cited by the Examiner

UNITED STATES PATENTS

| | | | |
|---|---|---|---|
| 51,762 | 12/1865 | Towers | 8—94.18 |
| 264,776 | 9/1882 | Sharp | 85—55 X |
| 293,726 | 2/1884 | Fancher | 85—43 |
| 2,343,077 | 2/1944 | Parrish | 287—23 |
| 2,936,009 | 5/1960 | McGuire | 144—309 |

OTHER REFERENCES

Gustavson, The Chemistry and Reactivity of Collagen, Academic Press, Inc., New York, 1956, pages 205 and 206.

CARL W. TOMLIN, *Primary Examiner.*

D. W. AROLA, *Assistant Examiner.*